United States Patent [19]

Sekine et al.

[11] 3,895,314

[45] July 15, 1975

[54] SOLID-STATE ACTIVE DEVICE

[75] Inventors: Kenji Sekine, Tokorozawa; Yoichi Kaneko, Hachioji, both of Japan

[73] Assignee: Hitachi, Ltd., Japan

[22] Filed: Mar. 19, 1973

[21] Appl. No.: 342,444

[30] Foreign Application Priority Data

Mar. 17, 1972 Japan ............................... 47-26568

[52] U.S. Cl. ............................ 331/107 R; 331/101

[51] Int. Cl. ............................................ H03b 7/14

[58] Field of Search....... 331/96, 101, 107 R, 107 G

[56] References Cited

OTHER PUBLICATIONS

Electronics, Kramer, Oct. 11, 1971, pp. 78–81.

"Circuit Design for MM-Wave Impatt Oscillators" N.D. Kenyon May 11–14 1970 pp. 300–303. International Microwave Symposium Microwave Journal, G. C. Dalman Mar. 1968, pp. 32, 34, 149, 150.

Proceedings of IEEE May 1970, F. M. Magalhaes pp. 831—832.

*Primary Examiner*—John Kominski

*Attorney, Agent, or Firm*—Craig & Antonelli

[57] ABSTRACT

An active device comprises an IMPATT diode arranged on a heat sink block, a coaxial cavity resonator whose inner conductor of coaxial line is the supply means for supplying a DC bias to the oscillator element, a resonance circuit formed of that part of the inner conductor which is around the oscillator element, a step waveguide to which an output from the resonance circuit is transmitted through an output coupling part formed of the inner conductor and the outer wall of the coaxial cavity resonator, and a short piston for closing that end of the waveguide which is an open terminal of minimum height. The open terminal is electromagnetically coupled with the output coupling part and has its height made smaller than the size of a standard waveguide.

9 Claims, 3 Drawing Figures

SOLID-STATE ACTIVE DEVICE

BACKGROUND OF THE INVENTION

1. Field of the Invention

This invention relates to a solid-state active device employing such a solid-state oscillator element as a Gunn diode and an IMPATT diode. More particularly, it relates to an active device which, using a coaxial cavity resonator, has the output transition characteristic from the coaxial section to the waveguide section made wind-band.

2. Description of the Prior Art

In general, a negative-resistance amplifier or a locking amplifier employing a solid-state oscillator element is realized in such way that a circulator, a directional coupler or the like is added to the output part of the solid-state oscillator and that the impedance of the coupling window of the solid-state oscillator is varied to control oscillation.

In a prior-art oscillator using the solid-state oscillator element, accordingly, the impedance of the oscillator element is very low as compared with the impedance of a standard waveguide. To facilitate impedance matching between the element and the circuit to reduce the loaded Q of the oscillator, therefore, a method has been adopted in which the oscillator element is coupled to a coaxial circuit of low circuit impedance, to transfer an output signal of the coaxial circuit to the waveguide.

The prior-art active device employing the coaxial circuit, however, uses the waveguide for a resonant circuit. Therefore, it has the disadvantage that a wide-band frequency characteristic is not obtainable as will be hereinafter stated.

Summary of the Invention

An object of the present invention is to provide a solid-state active device which can realize an amplifier having a wide-band frequency characteristic.

Another object of the present invention is to provide an active device which is low with respect to the loaded Q of a resonance circuit.

In order to accomplish such objects, according to the present invention, a resonance circuit is formed of that part of the inner conductor of a coaxial cavity resonator which surrounds a solid-state oscillator element, to dispense with a resonant circuit in a waveguide section. Therewith, the minimum height of the open terminal of a waveguide to be coupled with the coaxial cavity resonator is made smaller than the height of the open terminal of a standard waveguide.

The present invention will be described hereunder in comparison with a prior art and with reference to the accompanying drawings.

Description of the Preferred Embodiments

Figure 1:
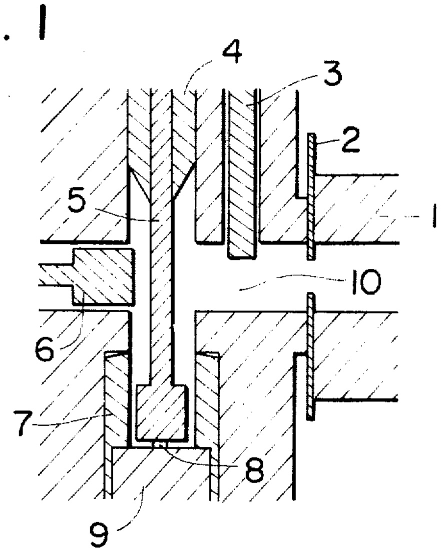
FIG. 1 PRIOR ART
FIG. 1 is a sectional view showing the structure of a prior-art solid-state active device of the coaxial-waveguide type.

Referring to a sectional view in FIG. 1 which illustrates the structure of a prior-art solid-state active device of the coaxial-waveguide type, numeral 1 designates a waveguide, 2 an iris, and 3 a quartz rod for temperature compensation at various frequencies. Numeral 4 indicates an absorber, and 5 an inner conductor of a coaxial cavity resonator, with its extension part serving as a DC bias voltage-applying terminal. Numeral 6 represents a short piston, 7 a spacer, 8 an oscillator element, 9 a heat sink block, and 10 the waveguide resonator.

In the oscillator of the prior-art structure as shown in FIG. 1, the coaxial section is comprised in order to establish the impedance matching between the oscillator element and the circuit. The waveguide resonator 10 is formed by putting the iris 2 into the waveguide 1. The oscillation frequency is determined by the resonator. The coupling between the coaxial section and the waveguide resonator is adjusted by the short piston 6. Since, however, the waveguide resonator is used as a resonance circuit in the structure, reduction of the loaded Q of the resonance circuit is more difficult than in a coaxial cavity resonator, etc. Accordingly, where such an oscillator is combined with a circulator or the like to construct an amplifier, a broad band-width characteristic is disadvantageously unavailable.

Figure 2:
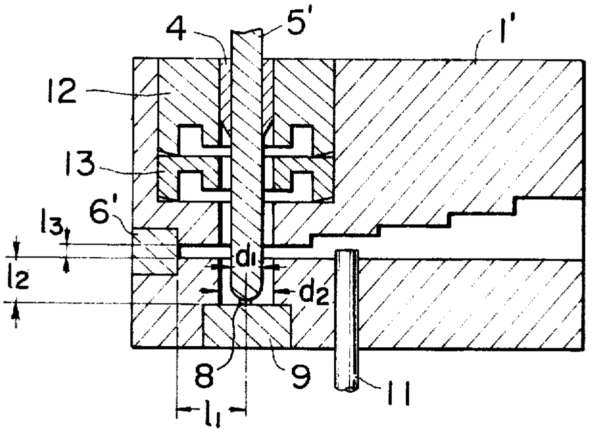
FIG. 2 is a sectional view showing the structure of a solid-state active device of the coaxial-waveguide type according to the present invention.

FIG. 2 is a sectional view showing the structure of a solid-state active device of the coaxial-waveguide type according to the present invention. The structure employs an RF (radio-frequency) filter which has a frequency band characteristic. Referring to the figure, symbol 1′ designates a step waveguide, 4 a microwave absorber, 5′ an inner conductor of a coaxial line, 12 a block A for an RF filter (hereinbelow, simply termed "block A"), 13 a block B for the RF filter (hereinafter, simply called "block B"), 6′ a short-circuit plate, 8 a solid-state oscillator element, 9 a heat sink block, and 11 an output tuning stub.

In the above construction, a DC bias voltage is applied via the inner conductor of coaxial line 5′ to the solid-state oscillator element 8 through the RF filter mechanism which has a frequency band characteristic and which is composed of the blocks A and B.

Further, a resonance circuit by which the oscillation frequency is determined is formed of that part of the inner conductor of coaxial line 5′ which surrounds the solid-state oscillator element 8. An output coupling part for taking out an output is formed of the space between the inner conductor 5′ of the coaxial section and the outer wall of the coaxial section. If the characteristic impedance of the coaxial section as determined by the outside diameter $d_1$ of the inner conductor 5′ and the inside diameter $d_2$ of the outer wall of the coaxial section is appropriately selected, there can be obtained a coupling which provides the optimum output of low loaded Q. It is a matter of course that, by varying the characteristic impedance of the coaxial section, the active device can be used as a negative-resistance amplifier with the self-oscillation of the solid-state oscillator element restrained or as a locking amplifier with the oscillation caused.

For example, consider a case where in IMPATT diode is employed as the solid-state oscillator element and where the waveguide impedance of a coaxial-waveguide transition section is made 60Ω. As for the negative-resistance amplifier, when the characteristic impedance of the coaxial section is made 10Ω to 20Ω, the series load resistance with the circuit side viewed from the oscillator element becomes approximately 1.7Ω to 6.6Ω, and the oscillation is restrained. As for the locking amplifier, when the characteristic impedance is made 3Ω to 10Ω, the series load resistance with the circuit side viewed from the oscillator element becomes approximately 0.15Ω to 1.7Ω, and the active device can be used under the oscillating state.

The impedance of the coaxial section can be equivalently varied by means of the output tuning stub 11. More specifically, the impedance of the coaxial section is previously so set as to restrain self-oscillation. When the output tuning stub is inserted, the equivalent impedance of the coaxial section is lowered. It is thus possible to give rise to the self-oscillation.

It is needless to say that, in the case of using the active device as an amplifier with a wide-band frequency characteristic, the state under which the stub is fully drawn out is suitable.

The resonance circuit formed of the coaxial section is thus advantageous in being capable of providing a resonator which generally has a very low loaded Q. The advantage, however, cannot be afforded if the transition characteristic of the output from the coaxial section to the waveguide section has a narrow frequency band. It is, therefore, necessary that the output transition characteristic has a wide frequency band. In the present invention, accordingly, a step waveguide is used as the waveguide 1' in order to reduce the characteristic impedance. The step waveguide is so determined that its one end may become an open terminal of a minimum height smaller than the size (bore) of the standard waveguide. The one end of the waveguide 1' being an open terminal is closed by the short-circuit piston 6', so that the open terminal of minimum height is electromagnetically coupled with the output coupling part. Thus, the output is transmitted to the waveguide 1' from the resonance circuit formed of that part of the inner conductor 5' which is around the solid-state oscillator element. The present invention employs the waveguide of the step type as the so-called transformer (shown in FIG. 2 is a $\lambda_g/4$-transformer, $\lambda_g$ denoting the guide wavelength).

As described above, according to the present invention, the height $l_3$ of the open terminal is made smaller than the size of the conventional standard waveguide. It is desirable that $l_3$ is set to be, for example, smaller than 1/3 of the size of the standard waveguide. Typically, the standard waveguide is type RG-96/U, which has an inner width of 0.28 inches and an inner height of 0.14 inches. The reason is that, when $l_3$ is set at such value, higher harmonics leading to unnecessary modes are not generated.

Figure 3:
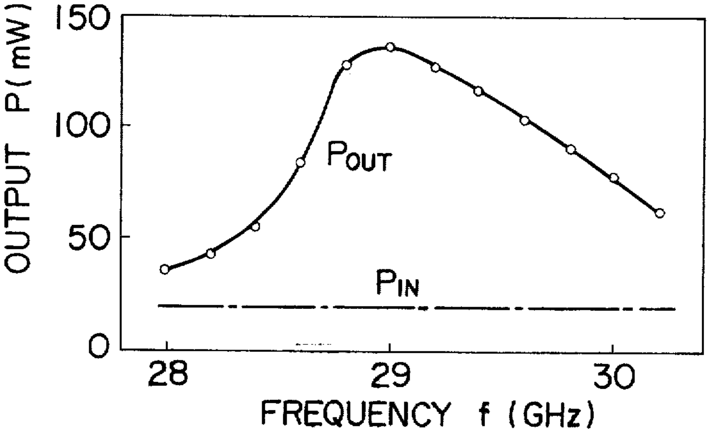
FIG. 3 is a diagram showing the amplification characteristic of a negative-resistance amplifier which employs the oscillator of the present invention.

FIG. 3 illustrates an amplification characteristic in the case where a negative-resistance amplifier employs an active device in which the height $l_3$ is set at one fourth of the size of the standard waveguide, while the distance $l_1$ (see FIG. 2) from the waveguide short-circuit plane of the short-circuit plate 6' to the inner conductor 5' is made $\frac{1}{4}\lambda_g$.

In FIG. 3, the ordinate represents the power and the abscissa frequency, and the relationship between the input power $P_{in}$ and the output power $P_{out}$ is shown. As is apparent from the figure, at an amplification gain of 8.4 dB, the band of frequencies lower by 1 dB or less is 840 MHz. The amplifier has a frequency response of such a wide band.

Although, in the foregoing, the transformer having the wide-band frequency characteristic is of the step type, it is a matter of course that the taper type is also utilizable. In general, the electric field has an anti-node at $\lambda/4$ (where $\lambda$ denotes the magnitude of the space wavelength). At this part, the change of the electric field is the smallest with respect to a frequency change. It is, accordingly, desirable to select the length $l_2$ of the coaxial section (see FIG. 2) at a value close to $\lambda/4$. The length $l_2$ is slightly varied by the use of the spacer or the like, whereby the adjustment of the frequency is possible.

With the active device rendered wide in the frequency band as stated above, when the resonance point is located at a frequency other than a desired one or when higher harmonic components are generated even with the same resonator, adverse effects can be exerted on various characteristics of an amplifier at the desired frequency. In accordance with the present invention, therefore, if necessary, the RF filter mechanism provided at the part at which the DC bias is applied is given a frequency band characteristic in order to remove such adverse effects. Thus, an oscillation other than that required and the generation of higher harmonics are suppressed. To impart a frequency band characteristic to the RF filter mechanism, the filter section is made the choke structure. At a place beyond the two stages of blocks A and B for the RF filter, an action like that of a no-reflection terminal is brought forth by the use of the microwave absorber 4. It is a matter of course that, if the number of the stages of the blocks and the dimensions of the respective choke parts are appropriately selected, any desired band characteristic can be obtained.

As described above, in accordance with the present invention, the characteristic of loaded Q is attained which is low as compared with that in the prior-art coaxial-waveguide type solid-state oscillator of the mechanism wherein the resonance circuit is included in the waveguide section and wherein the output is regulated by the short piston. Simultaneously therewith, the dimensions of the coaxial section are changed to regulate the characteristic impedance, whereby the control of the self-oscillation can be easily made. It is thus possible to provide a solid-state amplifier having a wide-band frequency characteristic.

What is claimed is:

1. A solid-state active device comprising:

a solid-state oscillator element arranged on a heat sink;

a coaxial cavity resonator including a coaxial line having an outer cylindrical wall coaxially surrounding an inner conductor and having bias supply means comprising said inner conductor for supplying a DC bias voltage to said solid-state oscillator element;

a resonance circuit for establishing an oscillation frequency and formed of that part of said inner conductor within said cylindrical wall of said coaxial line, which line is around said solid-state oscillator element;

an output coupling part formed of said inner conductor and said outer cylindrical wall of said coaxial cavity resonator;

a waveguide whose open terminal of a minimum height is electromagnetically connected with said output coupling part in order that an output from said resonance circuit may be derived through said output coupling part;

a short-circuit piston for closing said open terminal; and an output tuning stub provided at said waveguide, the characteristic impedance of the coaxial part being selected by the outside diameter of said inner conductor and the inside diameter of said outer cylindrical wall.

2. The solid-state active device according to claim 1, comprising a radio-frequency filter which is interposed between said coaxial cavity resonator and said DC bias supply means and which has a frequency band characteristic.

3. A solid-state active device comprising:

a solid-state oscillator element disposed on a heat sink;

a coaxial cylindrical cavity wall surrounding said element the diameter of the cavity bounded by said wall having a first prescribed dimension;

a cylindrical conductor rod coaxial with the wall of said cavity and contacting said element at one end thereof, the diameter of said rod being a second prescribed dimension and being less than said first prescribed dimension;

a waveguide, the open terminal end of which is of a minimum height and is electromagnetically coupled to said cavity, so that the oscillation output from said element within said cavity may be electromagnetically coupled therefrom;

a short-circuiting piston element spaced from the axis of said rod a predetermined distance and closing the open terminal end of said waveguide; and an output tuning stub provided in said waveguide.

4. A solid-state device according to claim 3, further comprising means, connected to said conductor rod, for supplying a DC bias therethrough to said oscillator element and an RF filter section surrounding said rod and disposed between said DC supply means and said cavity.

5. A solid-state active device according to claim 3, wherein said waveguide has a stepped cross-section along the length thereof with the smallest step being coupled with said cavity.

6. A solid-state active device according to claim 5, wherein the waveguide terminating end of said short-circuiting piston element is spaced from the axis of said rod by one-quarter of guide wavelength.

7. A solid-state active device according to claim 5, wherein the distance along the cavity wall surrounding said rod and active element from said smallest step end of said waveguide to said heat sink is approximately one-quarter of the guide wavelength.

8. A solid-state active device according to claim 3, wherein said active element comprises an IMPATT diode.

9. A solid-state active device according to claim 4, wherein said waveguide has a stepped cross-section along the length thereof with the smallest step being coupled with said cavity.

* * * * *